(12) United States Patent
Iotti

(10) Patent No.: US 10,865,765 B2
(45) Date of Patent: Dec. 15, 2020

(54) DEVICE FOR SUPPLYING AND MODIFYING A CYLINDER CUBIC CAPACITY OF A HYDRAULIC MOTOR

(71) Applicant: MANITOU ITALIA S.R.L., Castlefranco Emilia (IT)

(72) Inventor: Marco Iotti, Reggio Emilia (IT)

(73) Assignee: MANITOU ITALIA S.R.L., Castlefranco Emilia (IT)

( * ) Notice: Subject to any disclaimer, the term of this patent is extended or adjusted under 35 U.S.C. 154(b) by 261 days.

(21) Appl. No.: 16/051,963

(22) Filed: Aug. 1, 2018

(65) Prior Publication Data

US 2019/0093625 A1  Mar. 28, 2019

(30) Foreign Application Priority Data

Sep. 25, 2017  (IT) .......... 102017000106781

(51) Int. Cl.
| | |
|---|---|
| F03C 1/00 | (2006.01) |
| F16H 61/423 | (2010.01) |
| B66D 1/44 | (2006.01) |
| B66D 1/56 | (2006.01) |

(52) U.S. Cl.
CPC ............... *F03C 1/005* (2013.01); *B66D 1/44* (2013.01); *B66D 1/56* (2013.01); *F16H 61/423* (2013.01); *B66D 2700/035* (2013.01)

(58) Field of Classification Search
CPC .......... F16H 61/423; F03C 1/005; B66D 1/44
See application file for complete search history.

(56) References Cited

U.S. PATENT DOCUMENTS

| | | | | |
|---|---|---|---|---|
| 4,481,769 A | * | 11/1984 | Nagahara | B60W 10/103 60/441 |
| 6,371,447 B1 | | 4/2002 | Imanishi et al. | |
| 6,571,553 B1 | * | 6/2003 | Habermann | B66D 1/44 60/443 |
| 7,415,821 B2 | * | 8/2008 | Heinz | F03C 1/003 60/445 |

(Continued)

FOREIGN PATENT DOCUMENTS

| | | |
|---|---|---|
| JP | S61248899 A | 11/1986 |
| JP | S6283996 B2 | 3/1991 |

*Primary Examiner* — Michael Leslie
(74) *Attorney, Agent, or Firm* — Pearne & Gordon LLP

(57) ABSTRACT

A device for supplying and modifying the cylinder cubic capacity of a hydraulic motor, comprising: a first conduit (1) for supplying and discharging an operating fluid to a first side of the hydraulic motor (M); a second conduit (2) for supplying and discharging an operating fluid to a second side of the motor (M); an actuator (3) provided to modify the cubic capacity of the motor (M); an increase conduit (31) for increasing the cubic capacity of the motor (M), connected to the actuator (3) for supplying operating fluid to a side of the actuator (3) which produces an increase of the cubic capacity of the motor (M); a reduction conduit (32) for reducing the cubic capacity of the motor (M), connected to the actuator (3) for supplying operating fluid to a side of the actuator (3), which produces a reduction of the cubic capacity of the motor (M). The device is structured to supply to the increase conduit (31) and to the reduction conduit (32) a proportional pressure to the load acting on the winch.

5 Claims, 3 Drawing Sheets

(56) References Cited

U.S. PATENT DOCUMENTS

| | | | |
|---|---|---|---|
| 8,930,094 B2* | 1/2015 | Torii | B66C 13/20 |
| | | | 701/123 |
| 10,233,060 B2* | 3/2019 | Shan | B66D 1/08 |
| 10,590,908 B2* | 3/2020 | Bidell | F04B 1/28 |
| 2004/0211614 A1* | 10/2004 | Matsuyama | F16H 61/433 |
| | | | 180/305 |
| 2013/0311051 A1 | 11/2013 | Torii | |

* cited by examiner

DEVICE FOR SUPPLYING AND MODIFYING A CYLINDER CUBIC CAPACITY OF A HYDRAULIC MOTOR

The present invention relates to a device for supplying and modifying a cylinder cubic capacity of a hydraulic motor.

Different types of hydraulic motors with variable cubic capacity, of rotary or piston type, are currently available. The possibility to modify their cubic capacity enables these motors to modify their rotation speed while keeping the supply flow rate constant.

When the cubic capacity is increased, the motor increases the delivered torque, reducing the rotation speed. Vice versa, a reduction in cubic capacity implies an increase of the rotation speed and a reduction of the delivered torque.

An example of the use of a hydraulic motor with a variable cubic capacity is the activation of a winch for lifting or pulling a load. In the absence of a load, or for low loads, the cubic capacity of the motor can be reduced and the rotation speed increased, thus increasing the rotation speed of the winch. As the load increases, it is possible to increase the cubic capacity so as to have greater torque.

Motors with variable cubic capacity currently available are activated and controlled through devices that comprise a first conduit, for supplying and discharging an operating fluid to a side of the hydraulic motor, and a second conduit, for supplying and discharging the operating fluid to the opposite side of the motor. The supply to the first or to the second conduit activates the motor in one rotation direction or in the opposite direction. An actuator is provided for modifying a cubic capacity of the motor. Such an actuator is normally of the oil dynamic type, e.g. a piston. An increase conduit for increasing the cubic capacity of the motor is connected to the actuator for supplying operating fluid to a side of the actuator which produces an increase of the cubic capacity of the motor. A reduction conduit for reducing the cubic capacity of the motor is connected to the actuator for supplying operating fluid to the opposite side of the actuator, which produces a reduction of the cubic capacity of the motor.

The cubic capacity modification of the motor can therefore be commanded by supplying the increase conduit or the reduction conduit with the operating fluid.

In current devices, the cubic capacity increase or reduction command is sent manually by an operator. In substance, based on their experience, the operator adjusts the cubic capacity of the motor in relation to the load to be moved. This implies that often the motor does not work under the best possible conditions, as the assessment of the load by the operator cannot be absolutely precise, with the exception of some limit situations, e.g. movement without a load, for which the minimum cubic capacity is used in order to have the maximum rotation speed, or movement with maximum load, for which the maximum cubic capacity is used.

The aim of the present invention is to offer a device for supplying and modifying the cubic capacity of a hydraulic motor that makes it possible to overcome the limits of currently available devices.

The main advantage of the device according to the present invention is that it allows the automatic adjustment of the cubic capacity of the motor, i.e. without requiring the intervention of an operator, based on the size of the load to which the motor is subjected.

Further features and advantages of the present invention will become more apparent in the following detailed description of an embodiment of the present invention, illustrated by way of non-limiting example in the attached figures, in which.

Figure 1:
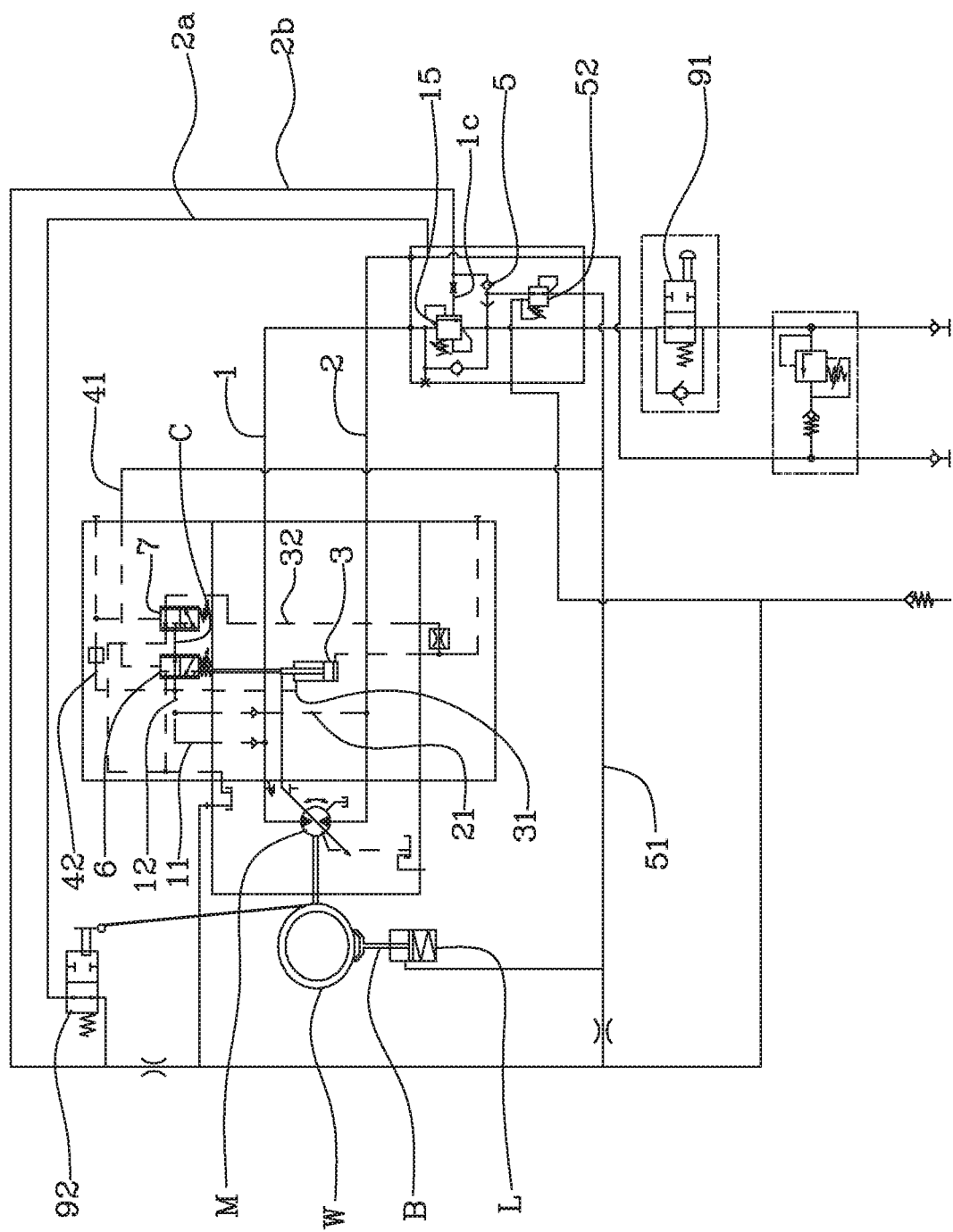
FIG. 1 shows a schematic view of the device in a first operating configuration of increased cubic capacity.

In the embodiment shown, the device according to the present invention is used for supplying and modifying the cubic capacity of a hydraulic motor (M) of the rotary or piston type, with a variable cubic capacity. The device could however be used for motors of another type.

By way of example, the motor (M), in turn, may be used for commanding a lifting winch (W). In a known way, the winch (W) comprises at least one winding drum onto which a rope is wound. The drum can rotate in the two rotation directions for winding and unwinding a rope between a maximum winding condition and a maximum unwinding condition.

The device according to the present invention comprises a first conduit (1), for supplying and discharging an operating fluid to a first side of the motor (M), and a second conduit (2) for supplying and discharging an operating fluid to a second side of the hydraulic motor (M).

In the example shown, the supply of operating fluid to the first side of the motor (M), through the first conduit (1), produces the rotation in one direction of the motor (M), e.g. a rotation that produces the winding of the winch and the pulling of the load associated therewith. During the supply to the first side of the motor (M), the operating fluid is discharged through the second side of the motor (M) and through the second conduit (2). Vice versa, the supply of operating fluid to the second side of the motor (M), through the second conduit (2), produces the rotation of the motor (M) in the opposite direction, e.g. a rotation that produces the unwinding of the winch and the release of the load associated therewith.

A distributor is connected to the first conduit (1) and to the second conduit (2) for adjusting by command the supply and discharge of the operating fluid coming from one pump to one or another of the conduits (1,2), in a known way in the sector. The distributor is known in the sector and will therefore not be described in further detail.

The device according to the present invention further comprises an actuator (3), provided to modify the cubic capacity of the motor (M). In substance, the actuator (3) is mechanically connected to a movable part of the motor (M) which, by moving, modifies the cubic capacity of the motor (M). Various types of actuators (3) and motors (M) with variable cubic capacity are known to a person skilled in the art and therefore will not be described in further detail, since the device according to the present invention can be used in any case.

An increase conduit (31) for increasing the cubic capacity of the motor (M) is connected to the actuator (3). Such increase conduit (31) is provided for supplying operating fluid to a side of the actuator (3) which produces an increase of the cubic capacity of the motor (M). In the example shown, the actuator (3) is in the form of a cylinder, and the increase conduit (31) is connected to the shaft side of the actuator (3). A reduction conduit (32) for reducing the cubic capacity of the motor (M) is also connected to the actuator (3). Such reduction conduit is provided for supplying operating fluid to the opposite side of the actuator (3) which produces a reduction of the cubic capacity of the motor (M).

In the example shown, the reduction conduit (32) is connected to the bottom side of the actuator (3).

Unlike the devices currently available, the device according to the present invention comprises a first piloting conduit (41), connected to a bistable valve (5) which is connected at the inlet to the first conduit (1) and to the second conduit (2). The first piloting conduit (41) is connected to the outlet of the bistable valve (5).

As known in the sector, the bistable valve (5) is provided with a floating element able to move between the outlet openings of the first conduit (1) and of the second conduit (2) due to the effect of the thrust produced by the operating fluid. In the event that the supply of operating fluid takes place through the first conduit (1), the floating element is pushed towards the outlet of the second conduit (2), causing the closure thereof. Vice versa, in the event that the supply of operating fluid takes place through the second conduit (2), the floating element is pushed towards the outlet of the first conduit (1), causing the closure thereof. In both cases, the piloting conduit (41) is supplied with the operating fluid.

The first piloting conduit (41) is connected, at the outlet, to a first valve (6), whose characteristics and function will be described below.

The device according to the present invention comprises a third conduit (11), connected at the inlet to the first conduit (1) and at the outlet to a union (12). Preferably, the third conduit (11) is provided with a non-return valve that only allows the flow from the first conduit (1) towards the union (12).

A fourth conduit (21) is also connected at the inlet to the second conduit (2) and at the outlet to the union (12). Preferably, also the fourth conduit (21) is provided with a non-return valve that only allows the flow from the second conduit (2) to the union (12).

In turn, the union (12) is connected to the increase conduit (31); for producing, under certain conditions, the increase of cubic capacity of the motor (M). In substance, under certain conditions the operating fluid coming from the first conduit (1) or from the second conduit (2), through the union (12), is supplied to the increase conduit (31) and causes the displacement of the actuator (3) which commands the increase of cubic capacity of the motor (M).

For that purpose, the device according to the present invention comprises a first valve (6) and a second valve (7), connected to each other through a channel (C).

Figure 2:
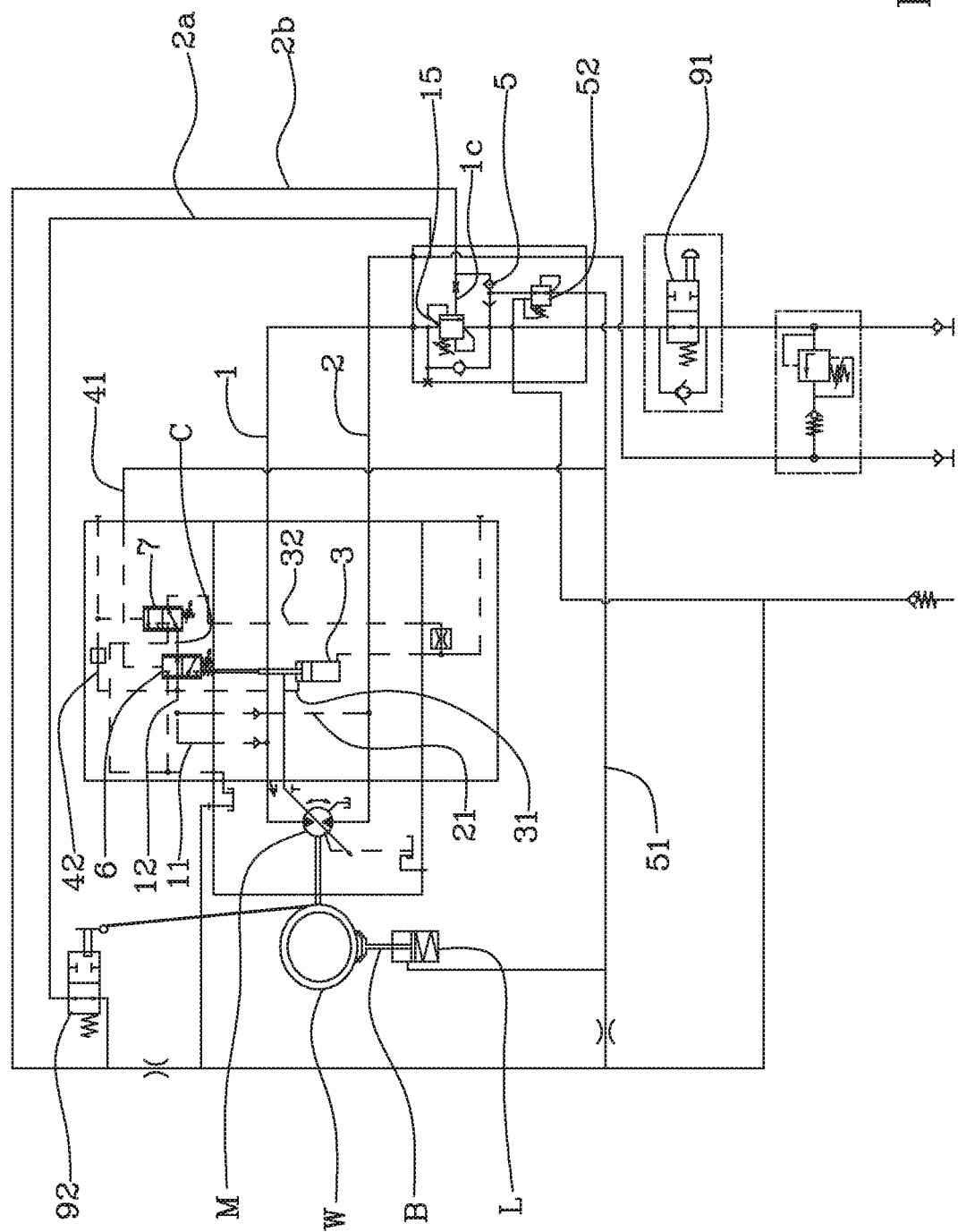
FIG. 2 shows a schematic view of the device in a second operating configuration of reduced cubic capacity.
Figure 3:
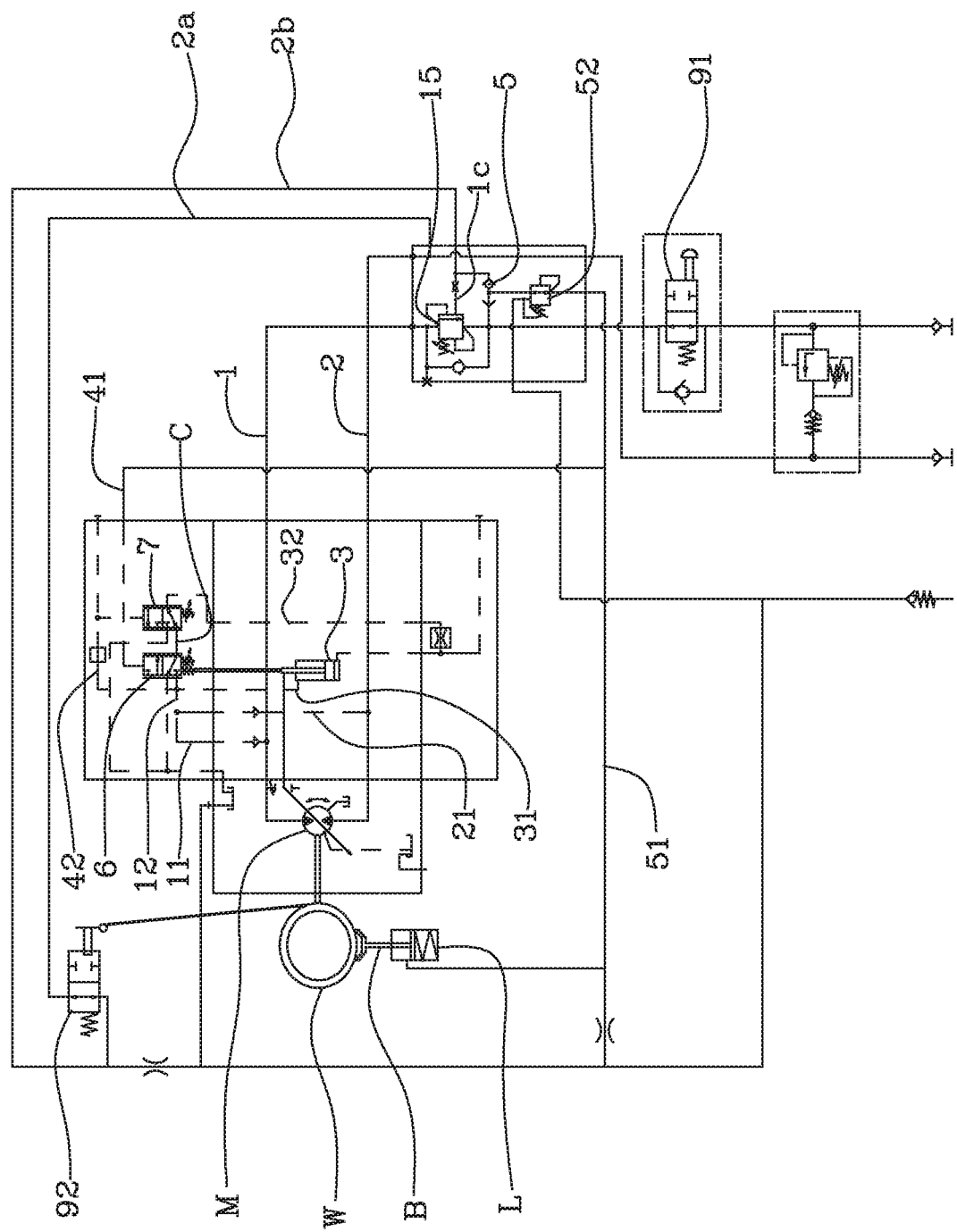
FIG. 3 shows a schematic view of the device, in a rest configuration or in the absence of any command.

The first valve (6) can take a first operating position, in which it sets the union (12) in communication with the second valve (7) (FIGS. 1 and 2), and a second operating position, in which it occludes the union (12) (FIG. 3). The first piloting conduit (41) is connected to the first valve (6) so as to displace it from the second position towards the first position. In substance, the first valve (6) is provided with a movable shutter, with three ways and two positions, which is piloted from the second position towards the first position by the pressure exerted by the operating fluid present in the first piloting conduit (41). An elastic means, e.g., a spring, pushes the first valve (6) from the first position towards the second position. The elastic means or spring can be calibrated, i.e. it is possible to adjust the thrust exerted to a desired calibration value. Thanks to the connection to the first piloting conduit (41), the sending of operating fluid to the first conduit (1) or to the second conduit (2), following a command for the winding or unwinding of the winch (VV), causes the displacement of the first valve (6) into the first operating position, that can be seen in FIGS. 1 and 2.

In turn, the second valve (7) can take a first operating position, in which it occludes the union (12) (FIG. 1), or it occludes the channel (C), and a second operating position (FIG. 2), in which it sets the union (12) in communication with the reduction conduit (32). In the second operating position of the second valve (7), the operating fluid, coming from the union (12), is supplied to the reduction conduit (32), passing through the first valve (6), the channel (C) and the second valve (7).

A second piloting conduit (42) is connected to the union (12) and to the second valve (7) so as to displace the second valve from the second operating position to the first operating position. In substance, the second valve (7) is provided with a movable shutter, with three ways and two positions, which is piloted from the second position towards the first position by the pressure exerted by the operating fluid present in the second piloting conduit (42). An elastic means, e.g. a spring, pushes the second valve (7) from the first position towards the second position. Also in this case, the elastic means or spring can be calibrated, i.e. it is possible to adjust the thrust exerted to a desired calibration value. In particular, the calibration value of the second valve (7) is greater than the calibration value of the first valve (6), as the second valve (7) has to move into its first operating position due to a greater pressure with respect to the pressure that activates the first valve (6).

The operation of the device is as follows.

As the initial configuration, the one shown in FIG. 3 can be considered, which illustrates the device in the absence of any command.

In the event that a winding command of the winch (W) is sent, the pressurised fluid is transmitted to the first conduit (1). The bistable valve (5) sets the first conduit (1) in communication with the first piloting conduit (41) which in turn receives the pressurised fluid. Due to the effect of the pressure in the first piloting conduit (41), the first valve (6) moves into its first operating position (FIG. 1). The operating fluid, through the third conduit (11), is also supplied to the union (12) and to the second piloting conduit (42). In the event of a particularly high load on the winch, the pressure inside the first conduit (1) is also high, just like the pressure inside the second piloting conduit (42), apart from any throttling or pressure reductions. If the thrust exerted by the pressure inside the second piloting conduit (42) exceeds the calibration value of the second valve (7), the second valve (7) is brought into the first operating position (FIG. 1), occluding the channel (C) and the union (12). In such conditions, the operating fluid present in the third conduit (11) is supplied to the increase conduit (31) of the actuator (3), which therefore causes an increase of the cubic capacity of the motor (M). The fluid present in the actuator (3) at the cubic capacity reduction side is discharged through the reduction conduit (32). For that purpose, the second valve (7) in the first position, sets the reduction conduit (32) in connection with a discharge conduit.

If the pressure inside the first conduit (1) is reduced, due to the effect of the reduction of the load at the winch (W), the pressure in the second piloting conduit (42) is also reduced. If the pressure in the second piloting conduit (42) drops below the calibration value of the second valve (7), the latter is brought into the second operating position, illustrated in FIG. 2, in which it sets the union (12) in communication with the reduction conduit (32), through the first valve (6) and the channel (C). In such conditions the operating fluid is supplied to the reduction side of the actuator (3), so as to cause a reduction of the cubic capacity of the motor (M).

In the event of an unwinding command of the winch (W), the operation is the same as that described above, with the difference that the operating fluid is supplied from the second conduit (2) to the first piloting conduit (41) through the bistable valve (5), and with the difference that the operating fluid is supplied to the union (12) through the fourth conduit (21).

FIGS. 1 and 2 show respectively a maximum load and maximum cubic capacity condition of the motor (M) and a minimum load and minimum cubic capacity condition of the motor (M). The first and the second valve (6,7) comprise proportional shutters, i.e. shutters that let through a flow rate of oil proportional to the displacement reached from the closed position. This makes the adjustment of the cubic capacity continuous for all the intermediate load values. Furthermore, the adjustment of the cubic capacity is gradual, to prevent any jolts to the load even in the presence of pressure peaks.

It is further noted that in the initial configuration of FIG. 3 the cubic capacity is preferable maximum, particularly for safety reasons. In fact, if the motor (M) is at maximum cubic capacity and the winch (W) starts to be supplied with a load hanging, it is substantially certain that the winch will be able to support it. On the contrary, if the winch is activated with the maximum load hanging starting from a minimum cubic capacity, the load would descend in a dangerous manner during the transition towards the maximum cubic capacity.

In the embodiment shown, the bistable valve (5) is connected to the first piloting conduit (41) through a conduit (51) which, advantageously, can be used to send the pressurised fluid to a safety brake (B) that acts on the winch (W). In a known way to a person skilled in the art, the brake (B) is activated by an actuator (L) which, through an elastic means, keeps the brake in the closed and locked position of the winch. The actuator (L) is activated in the open position of the brake (B) by means of the operating fluid coming from the first conduit (1) or from the second conduit (2) through the bistable valve (5). Preferably, the conduit (51) connecting the bistable valve (5) to the first piloting conduit (41) is provided with a pressure reduction valve (52), so as to adjust the pressure to a desired value.

The first conduit (1) may be provided with a load balancing and support valve (15). In a known way, such balancing valve (15) allows the free passage of fluid, through a one-directional passage, towards the motor (M), and in particular towards the first side or the winding side of the motor (M), which causes the winding of the winch (W). In the absence of any command, the balancing valve (15) remains closed, contributing to preventing the unwinding of the winch (W) due to the effect of the load. In the presence of an unwinding command of the winch, the balancing valve (15) is piloted to open by the operating fluid supplied to the second conduit (2).

The device according to the present invention may also be provided with two limit switches (91,92). Both the switches comprise a two-way and two-position valve, held in the open position by an elastic means. Such valve is also connected to a mechanical element that is activated when the winch (W) nears a limit position. A first switch (91) is located along the first conduit (1) and is activated to close when the winch (W) nears the maximum winding position. A second switch (92) is located along the second conduit (2) and is activated to close when the winch (W) nears the maximum unwinding position. In particular, the second switch (92) is connected to the second conduit (2) through a first line (2a). A second line (2b) connects the second switch to the bistable valve (5). In this way, when the operating fluid is supplied to the second conduit (2) and the winch is not proximal to the limit detected by the second switch (92), the latter is in the open position and the operating fluid, through the second line (2b), reaches the bistable valve (5) and, through the conduit (51), the first piloting conduit and the actuator (L) of the brake (B). When the winch reaches the limit detected by the second switch (92), the latter is brought into the closed position and the operating fluid no longer reaches the bistable valve (5). In such conditions, the balancing valve (15), which is piloted to open by the pressure present in the second line (2b), through a connection (1c), closes, so that the operating fluid can no longer be discharged from the motor (M), which is, consequently, locked. Furthermore, the actuator (L) of the brake (B) no longer receives fluid from the bistable valve (5), so that the brake takes the active position and contributes to locking the winch (W).

The invention claimed is:

1. A device for supplying and modifying a cylinder cubic capacity of a hydraulic motor, comprising: a first conduit (1) for supplying and discharging an operating fluid to a first side of the hydraulic motor (M); a second conduit (2) for supplying and discharging an operating fluid to a second side of the hydraulic motor (M); an actuator (3), suitable for modifying a cubic capacity of the motor (M); an increase conduit (31) for increasing the cubic capacity of the motor (M), connected to the actuator (3) for supplying operating fluid to a side of the actuator (3) which produces an increase of the cubic capacity of the motor (M); a reduction conduit (32) for reducing the cubic capacity of the motor (M), connected to the actuator (3) for supplying operating fluid to a side of the actuator (3) which produces a reduction of the cubic capacity of the motor (M);

characterised in that:
the device comprises a first piloting conduit (41);
the device comprises a bistable valve (5), connected at the inlet to the first conduit (1) and to the second conduit (2) and at the outlet to the first piloting conduit (41);
the device comprises a third conduit (11), connected at the inlet to the first conduit (1) and at the outlet to a union (12);
the device comprises a fourth conduit (21), connected at the inlet to the second conduit (2) and at the outlet to the union (12);
the union (12) is connected to the increase conduit (31);
the device comprises a first valve (6) and a second valve (7), connected to one another;
the first valve (6) can take a first operating position, in which the first valve (6) sets the union (12) in communication with the second valve (7), and a second operating position, in which the first valve (6) occludes the union (12), wherein the first piloting conduit (41) is connected to the first valve (6) so as to displace the first valve (6) from the second position towards the first position;
the second valve (7) can take a first operating position, in which the second valve (7) occludes the union (12), and a second operating position, in which the second valve (7) sets the union (12) in communication with the reduction conduit (32), wherein a second piloting conduit (42) is connected to the union (12) and the second valve (7) so as to displace the second valve (7) from the second operating position to the first operating position.

2. The device according to claim 1, comprising a safety brake (B) normally active and deactivatable by actuation of an actuator (L), wherein the bistable valve (5) is connected to the first piloting conduit (41) via a conduit (51) which is also connected to the actuator (L) for deactivating the safety brake (B).

3. The device according to claim 2, wherein the conduit (51) connecting the bistable valve (5) to the first piloting conduit (41) is provided with a pressure reduction valve (52).

4. The device according to claim 1, wherein the first conduit (1) comprises a load balancing and support valve (15).

5. The device according to claim 1, comprising two limit switches (91, 92), wherein a first switch (91) is located along the first conduit (1) and is arranged to be activated to close when a winch (W), commanded by the motor (M), nears a maximum winding position, and wherein the second switch (92) is located along the second conduit (2) and is arranged to be activated to close when the winch (W) nears a maximum unwinding position.

* * * * *

UNITED STATES PATENT AND TRADEMARK OFFICE
CERTIFICATE OF CORRECTION

| | | |
|---|---|---|
| PATENT NO. | : 10,865,765 B2 | Page 1 of 1 |
| APPLICATION NO. | : 16/051963 | |
| DATED | : December 15, 2020 | |
| INVENTOR(S) | : Marco Iotti | |

It is certified that error appears in the above-identified patent and that said Letters Patent is hereby corrected as shown below:

On the Title Page

Under (71), please delete the city and country of Applicant, "Castlefranco Emilia (IT)" and insert therefor: --CASTELFRANCO EMILIA (IT)--.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*